J. C. BUCK.
VEGETABLE AND FRUIT GRADER.
APPLICATION FILED MAR. 3, 1919.

1,317,479.  Patented Sept. 30, 1919.

INVENTOR
Joseph C. Buck,
by
Owen, Owen & Crampton

UNITED STATES PATENT OFFICE.

JOSEPH C. BUCK, OF ADRIAN, MICHIGAN.

VEGETABLE AND FRUIT GRADER.

1,317,479.     Specification of Letters Patent.     Patented Sept. 30, 1919.

Application filed March 3, 1919. Serial No. 280,228.

*To all whom it may concern:*

Be it known that I, JOSEPH C. BUCK, a citizen of the United States, and a resident of Adrian, county of Lenawee, and State of Michigan, have invented a new and useful Vegetable and Fruit Grader; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention particularly relates to graders which are provided with a screen, and it has for its object to provide a means whereby the vegetables or fruit that become engaged in the screen, because of their close approximation to the size of the screen, may be readily eliminated or ejected from the parts of the screen and readily removed. My invention also has for its object to provide in connection with such a grader a means that will not only grade the vegetables or fruit, but will also provide a means whereby the vegetables or fruit may be readily distributed over a surface for the purpose of inspection and removal of faulty vegetables or fruit and yet wherein the vegetables or fruit may be readily graded or screened or separated, and a means wherein the separated vegetables or fruit may be readily removed from the screen or grader.

The invention may be contained in graders of different forms and such graders may be used for different purposes. In order to illustrate a practical application of my invention I have selected one of such constructions containing the invention and shall describe it hereinafter, it being understood that the details of construction of the structure selected may be greatly modified without departing from the spirit of the invention embodied in the form of construction selected. The construction selected is illustrated in the accompanying drawings.

Figure 1:
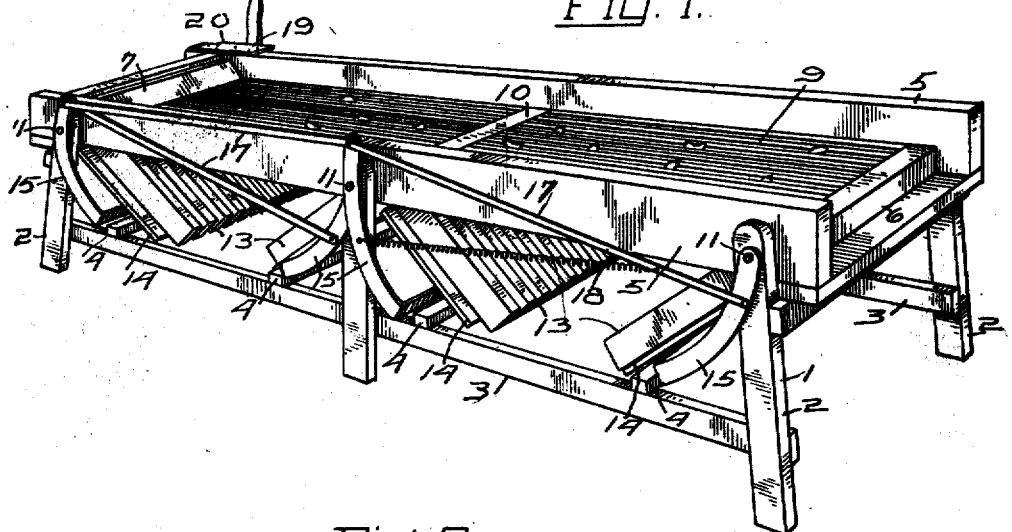
Figure 2:
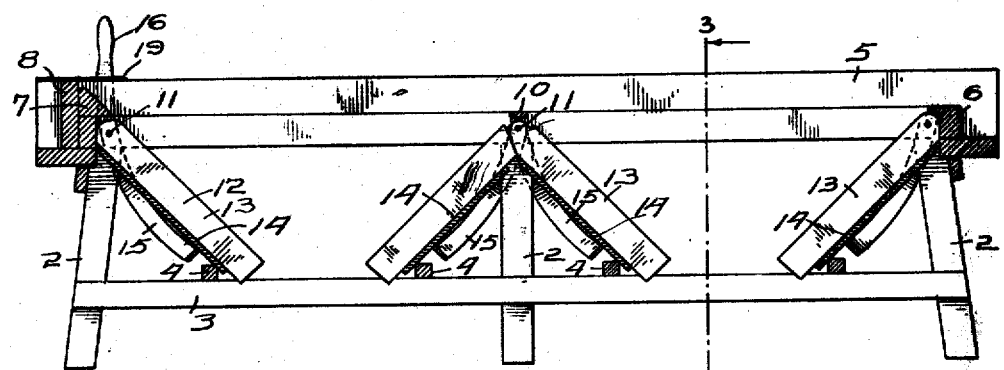
Figure 3:
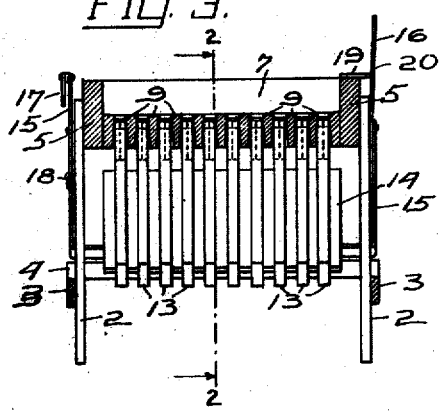
Figure 4:
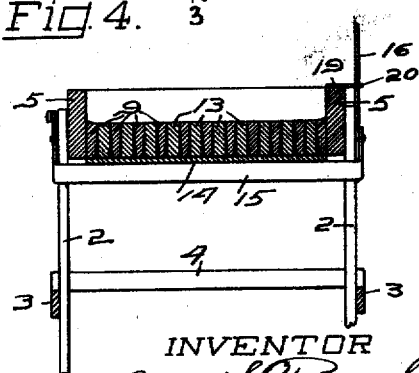

Figure 1 of the drawings is a perspective view of a grader containing my invention. Fig. 2 is a longitudinal sectional view of the grader illustrated in Fig. 1. Fig. 3 is a transverse sectional view taken on the line 3—3 indicated in Fig. 2. Fig. 4 is also a transverse sectional view showing parts of the grader in position for the purpose of inspection and also for the purpose of removal of the separated vegetables or fruit.

1 is a frame having the supporting legs 2 connected together by the longitudinal strips 3 and the transverse strips 4. The legs support a trough or table having the sides 5 and the end blocks 6 and 7. One end of the trough shaped table top is closed by the end board 8 and the upper edge of the end block 7 slopes away from the upper edge of the end board 8. A plurality of parallel strips 9 extend lengthwise of the table and between the blocks 6 and 7. They may also be tied together by the cross strip 10 located intermediate the length of the table. The parallel strips are disposed in spaced relation with respect to each other and at distances apart according to the size of the vegetable or fruit that is to be graded. If desired, the distances apart at which the strips are located from each other at one end of the table may be wider than the distance that they are located apart at the other end of the table. The top edges of the strips are substantially in the same plane or slightly above the plane of the end blocks 6 and 7 and of the cross strips 10.

Beneath the inner edges or overhanging ledges of the end blocks and beneath the transverse strips 10, there are located the cross or pivot rods 11 on which are pivoted the ejecting members 12 that have parallel strips 13 that fit in between the parallel strips 9 and are of a length substantially one-half the distance between the pivot rods 11. When the strips 13 are in place, the free ends of the strips 13 between any given pair of strips 9, meet and thus fill the spaces between the parallel strips 9. Moreover the top edges of the strips 13 are located substantially in the same plane with the top edges of the strips 9, so that when the strips 13 are in position between the strips 9 a substantially plane surface is presented on which the vegetables or fruit may be dumped or distributed and inspected. This enables the operator to remove objectionable fruit or vegetables and, also, determine the quality and character of the vegetables or fruit that is being inspected and graded.

The strips 13 are secured at their under edges to the boards 14 so that the strips 13 are held in position for manipulation. The boards 14 together with the strips attached thereto are manipulated and rotated short distances on the pivot rods 11 by means of levers 15 that are also pivoted on the pivot rods 11. The levers 15 are U-shaped members that extend from one side of the table, down and under the table and beneath the boards 14 and up along the opposite side of the table. They are operated by an extension of one of the levers that forms the handle 16 which the operator manipulates in operating the levers. The levers 15 are interconnected by links 17 which are connected at points of the levers 15 so as to cause the levers to raise the boards 14 and their strips 13, when the links are pulled or operated as tension members of the combination. The lower ends of the levers of each half length of the table are thus moved toward each other and consequently by the operation of the handle 16 the free ends of the boards 14 and their strips 13 are raised so as to place the strips 13 in position between the parallel strips 9. Inasmuch as the link 17 connecting the levers of the half of the table having the open end, moves in the direction opposite to that in which the lower part of the lever to which it is connected and located at the mid point of the table, the whole combination of levers and the weight of the boards 14 and their strips 13 may be counterbalanced by connecting those two parts, namely, the link 17 and the lever 15 together, by the spring 18. Thus these two levers are connected together by the counterbalancing member 18. Consequently in order to operate the boards all that is required is to overcome the friction or a slight additional load. The levers 15 may be locked in position when the strips 13 are placed between the strips 9, by means of a plate or locking member 19 which has a projection 20 that will be engaged by the lower part of the handle 16. The lever 15 will have sufficient elasticity to permit the handle to pass the engaging projection and be held against the edge of the plate to be engaged by the projection 20 when the boards are in their closed positions.

The transverse strips 4 are so located on the longitudinal strips 3 that the boards 14 will strike against the strips 4 when lowered and so that the boards 14 will be slightly released from the levers 15. This permits the boards to be knocked against the strips 4 and thus eject or liberate any vegetable or fruit that may fall from the screen and be engaged or caught by or between the strips 13. Moreover when the boards 14 are lowered to the cross bars or strips 4 they form incline surfaces that operate hopper like to direct the vegetables or fruit into a suitable receptacle that may be slid under the strips 3.

When the boards and their strips 13 are raised by the operation of the handle 16 the fruit or vegetables that are caught between the strips 9 by reason of the fact that they approximate the size of the strips, will be ejected from between the strips 9 and raised to the surface of the table. These may then be readily pushed over the surface of the table which then becomes a substantially smooth even surface, with those that are too large to pass through the screen to the open end of the table where they may be allowed to fall into a suitable receptacle. Moreover when the larger sized vegetables or fruit are removed the strips 13 fill the spaces between the strips 9 and present substantially a smooth plane surface, it enables the vegetables or fruit to be removed without injury to the fruit or vegetables. When the fruit or vegetables have been removed a new lot may be readily distributed over the surface and the same may be sorted or inspected as may be desired.

If the spaces between the lower half of the table, that is, the half near the open end, are wider than the spaces between the strips of the other half, the fruit or vegetables may be easily pushed from one half to the other half and sorted into three different grades as some may pass through the lower half that will not pass through the other half, in the manner well known in the art.

I claim:

1. In a grader, a plurality of strips located in parallel relation, a plurality of hinged boards having a plurality of parallel strips fitting the first named parallel strips and pivotally connected to the first named parallel strips, and means for operating the second named parallel strips.

2. In a grader, a plurality of parallel strips, a plurality of hinged boards, the boards having a plurality of parallel strips fitting between the first named parallel strips and a lever mechanism for operating the boards to move the boards to and away from the first named parallel strips.

3. In a grader, a plurality of parallel strips, a plurality of hinged boards, the boards having a plurality of parallel strips fitting between the first named parallel strips, a lever mechanism for operating the boards to move the boards to and away from the first named parallel strips, and a spring interconnecting the levers for balancing the weight of the boards.

4. In a grader, a plurality of parallel strips, a plurality of hinged boards, the boards having a plurality of parallel strips fitting between the first named parallel strips, a lever mechanism for operating the boards to move the boards to and away from the first named parallel strips, and a locking member for holding the second named parallel strips between the first named parallel strips.

5. In a grader, a plurality of parallel strips located in spaced relation, a plurality of pivoted strips fitting between the first named strips, and means for operating the second named strips.

6. In a grader, a plurality of parallel strips located in spaced relation, a plurality of strips fitting between the first named parallel strips, the upper edges of the said strips presenting substantially a plane surface, and means for moving the second named parallel strips to and from the first named parallel strips.

7. In a grader, a plurality of parallel strips located in spaced relation, a plurality of sets of parallel strips fitting the spaces between the first named parallel strips, and levers and links for operating the sets of parallel strips to move the sets of strips to and from the first named parallel strips.

8. In a grader, a plurality of parallel strips located in spaced relation, a plurality of sets of parallel strips fitting the spaces between the first named parallel strips, levers and links for operating the sets of parallel strips to move the sets of strips to and from the first named parallel strips, and a spring interconnecting the levers for balancing the weight of the sets of strips.

In testimony whereof I have hereunto signed my name to this specification.

JOSEPH C. BUCK.

Copies of this patent may be obtained for five cents each, by addressing the "Commissioner of Patents, Washington, D. C."